(12) United States Patent
Sheerin

(10) Patent No.: US 11,472,576 B2
(45) Date of Patent: Oct. 18, 2022

(54) CENTER OF GRAVITY PROPULSION SPACE LAUNCH VEHICLES

(71) Applicant: Geoffrey T. Sheerin, Sarnia (CA)

(72) Inventor: Geoffrey T. Sheerin, Sarnia (CA)

(*) Notice: Subject to any disclaimer, the term of this patent is extended or adjusted under 35 U.S.C. 154(b) by 0 days.

(21) Appl. No.: 17/044,704

(22) PCT Filed: Apr. 3, 2019

(86) PCT No.: PCT/IB2019/000551
§ 371 (c)(1),
(2) Date: Oct. 1, 2020

(87) PCT Pub. No.: WO2019/193424
PCT Pub. Date: Oct. 10, 2019

(65) Prior Publication Data
US 2021/0094704 A1    Apr. 1, 2021

Related U.S. Application Data

(60) Provisional application No. 62/652,369, filed on Apr. 4, 2018.

(51) Int. Cl.
*B64G 1/14*    (2006.01)
*B64G 1/00*    (2006.01)
*B64G 1/40*    (2006.01)

(52) U.S. Cl.
CPC .............. *B64G 1/14* (2013.01); *B64G 1/002* (2013.01); *B64G 1/40* (2013.01); *B64G 2700/24* (2013.01)

(58) Field of Classification Search
CPC ............ B64G 1/14; B64G 1/002; B64G 1/40; B64G 2700/24; B64G 1/00
See application file for complete search history.

(56) References Cited

U.S. PATENT DOCUMENTS

| 3,026,065 | A | | 3/1962 | Hollard, Jr. |
| 3,033,493 | A | | 5/1962 | Wilde et al. |
| 3,702,688 | A | | 11/1972 | Faget |
| 4,265,416 | A | * | 5/1981 | Jackson .................. B64G 1/14 |
| | | | | 244/159.3 |
| 4,802,639 | A | | 2/1989 | Hardy et al. |
| 5,159,809 | A | | 11/1992 | Ciais et al. |
| 5,608,182 | A | | 3/1997 | Thompson et al. |

(Continued)

FOREIGN PATENT DOCUMENTS

| DE | 4217374 | | 12/1993 | |
| EP | 0631931 | * | 4/1993 | ............... B64G 1/14 |

(Continued)

OTHER PUBLICATIONS

FR2018604A1Englishtranslation.*

(Continued)

*Primary Examiner* — Assres H Woldemaryam
(74) *Attorney, Agent, or Firm* — Peter J. Mikesell; Schmeiser, Olsen & Watts, LLP

(57) ABSTRACT

An aerospace vehicle that permits horizontal launch and subsequent orbital deployment of a second stage. The vehicle can be returned to Earth for subsequent re-use. Both land-based and water-based launch is disclosed. A rocket propulsion engine is located at the center of gravity of the vehicle and rotates to provide vertical and horizontal thrust.

12 Claims, 9 Drawing Sheets

(56) References Cited

U.S. PATENT DOCUMENTS

| | | | | |
|---|---|---|---|---|
| 5,975,464 | A | * | 11/1999 | Rutan .................... B64C 39/02 |
| | | | | 244/118.2 |
| 6,257,527 | B1 | | 7/2001 | Redding, Jr. |
| 8,800,934 | B1 | | 8/2014 | Straw |
| 2009/0179106 | A1 | * | 7/2009 | Ustinov .................. B64D 5/00 |
| | | | | 244/2 |
| 2015/0336685 | A1 | | 11/2015 | Wan |
| 2016/0347480 | A1 | | 12/2016 | Ferreira et al. |
| 2018/0265211 | A1 | * | 9/2018 | Burgener ................ B64D 3/00 |
| 2018/0339793 | A1 | * | 11/2018 | Chaudhary ........... B64G 1/005 |

FOREIGN PATENT DOCUMENTS

| | | | | |
|---|---|---|---|---|
| EP | 0631931 | | 1/1995 | |
| FR | 2018604 | | 5/1970 | |
| FR | 2018604 | A1 * | 5/1970 | ......... B64C 29/0075 |
| FR | 2623468 | * | 11/1987 | ............ B64C 39/04 |
| FR | 2623468 | | 5/1989 | |
| FR | 2623468 | A1 * | 5/1989 | ............ B64C 39/04 |
| FR | 2967971 | | 6/2012 | |
| GB | 2222635 | * | 10/1987 | .............. F02K 7/18 |
| GB | 2222635 | | 3/1990 | |

OTHER PUBLICATIONS

FR2623468A1 English Translation.*
Corda et al. "Stratolaunch Air-Launched Hypersonic Testbed", 2018.*
ISA/CA; International Search Report/Written Opinion for corresponding International Application PCT/IB2019/000551 dated Oct. 9, 2019; 11 pages.
Rosenberg; Stratolaunch rockets towards lift-off; Flight International; Mar. 13, 2012; vol. 181, No. 5332; p. 23.
EPO; Extended European Search report for corresponding EP Application 19780824.9 dated Nov. 23, 2021; 12 pages.

* cited by examiner

CENTER OF GRAVITY PROPULSION SPACE LAUNCH VEHICLES

CROSS-REFERENCE TO RELATED APPLICATIONS

This application claims priority to, and is a non-provisional of, U.S. Patent Application 62/652,369 (filed Apr. 4, 2018), the entirety of which is incorporated herein by reference.

BACKGROUND OF THE INVENTION

Historically, rocket propelled space launch vehicles have been, for the most part, unmanned or manned expendable ballistic devices. Except for a few air-launched rockets most space launch vehicles are launched vertically from the ground with a few vehicles using vertical decent and landing for recovery and reuse. For vertical ground launch vehicles, the rocket engines must provide thrust greater than the gross weight of the fully fueled launch vehicle. This necessitates launch vehicle designs that provide a tall thin propellant tank structure with a nose cone covering the payload on top and rocket engines on the base providing thrust and attitude control through gimbaled swivel of the engines. This launch vehicle configuration requires a launch pad structure and some type of gantry system to prepare the vehicle for flight that includes special systems for loading of propellants at great heights from the ground.

The launch facilities are located in special geographical locations that are removed from populated areas for safe flight operations. The down range flight paths are fixed within certain angles to miss land mass and other sovereign territory down range where tanks, nose cone fairings and other vehicle components could impact the ground during the flight to space. The ground launch facilities need well-developed ground infrastructure and its associated social support (roads, power, hotels, schools, hospitals, etc.), which radically increases the number of personnel participating in the work, and, therefore, the cost of operation. The usually expendable booster sections of vertical space launch vehicles are used once. This further increases the cost of each flight.

To alleviate the fixed geographical location problem and the liabilities that come with it, a few rocket systems have been launched from floating platforms out at sea. Those systems still use vertical rocket systems that must be supported in the same manner as land launch facilities. The sea launched version still require large investments of infrastructure and support equipment to achieve what is basically the same type of launch done from land-based systems. Attempted recovery of expendable boosters on water is further complicated with the requirement to keep sea water out of the engines at the impact point. Expensive water-proofing compartments add weight and cost to a launch vehicle and, if avoided, requires difficult precision vertical landings on water-based platforms to achieve dry recovery. All these systems suffer from inability to land and recover the payload just seconds after launch if the flight is aborted. Even rockets that are designed to return the first stage to a controlled landing cannot bring back the entire upper stage and payloads safely during abort at any point during the flight. The vertical launch and landing require the handling and stacking of payload using tall cranes and high gantry systems that further complicate launch preparations and post landing servicing.

Horizontal air launched vehicles can provide some return to site and payload recovery but are by nature much smaller in payload up-mass than vertical ground launch vehicles due to size limitations of carrier aircraft and wing loading limits.

Since large fleets of satellites have been, and are being, planned for launch into Earth orbit there is a need for reliable, repeatable, low-cost access to space for construction and maintenance of these fleets. Since the current designs of all launch vehicles have the engines mounted at the tail of the vehicle there are only two choices for design of current systems.

Either you build a launch vehicle that can launch horizontally with enough wing surface area to provide aerodynamic lift equal to the gross weight of the vehicle and payload, or you launch vertically with full engine thrust able to lift the gross weight of the vehicle and payload off the ground without aerodynamic lift. Current rocket engine technology (specific impulse limits), puts limits on the payload launched from the ground using aerodynamic lift due to the large propellant mass needed to get to orbit and the very large and heavy wings needed to lift that propellant.

A modern airliner has a fuel fraction of less than half its takeoff weight—usually about 26% for medium range and 45% for long haul flights. Payload of around 20%+ makes up the balance of the weight. As a result, the wing surface area needed to lift the airliner is the almost the same for takeoff and landing. By comparison the propellant fraction for a space launch vehicle is 85% so the empty weight plus payload of the rocket is a small fraction of the total takeoff weight. This presents a problem for anyone who wants to design a space launch vehicle that takes off and lands horizontally like an aircraft. There is an upper limit to wing loading that prevents normal aircraft design methods from being applied. The limits of tire technology will not allow aircraft to takeoff faster than 250 knots. Since wing lift is higher as speed increases a wing needed to lift very heavy launch vehicles would need to be quite large to stay within this speed limit. Usually the designer of horizontal takeoff launch vehicles realizes this bigger, heavier wing consumes the payload fraction of the launch vehicle making it impractical as a design solution. Then undercarriage needed to support the heavy fuel load and larger wings only adds to the payload fraction problem usually pushing it into the negative number territory. In summary wing surface area on a horizontal takeoff orbital launch vehicle needs to be oversized in comparison to that required during empty vehicle recovery and landing. This oversize design requires larger and heavier wings and undercarriage that consumes all or more of the payload mass to orbit.

Winged vehicles also have reentry heating issues when using a low angle of attack reentry to the earth's atmosphere. These high lift-to-drag reentry profiles significantly increase the heat load during reentry in contrast to low lift to drag ballistic reentry vehicles that use zero lift reentry of the earth's atmosphere.

To achieve low cost minimum infrastructure in payload integration, vehicle fueling and geographic political costs it is necessary to develop vehicles having the ability to launch horizontally that are self-contained and reusable such that they can be recovered in the same manner in which they depart.

BRIEF DESCRIPTION OF THE INVENTION

An aerospace vehicle that permits horizontal launch and subsequent orbital deployment of a second stage. The vehicle can be returned to Earth for subsequent re-use. Both land-based and water-based launch is disclosed. A rocket propulsion engine is located at the center of gravity of the vehicle and rotates to provide vertical and horizontal thrust.

In a first embodiment, a method for horizontally launching an aerospace vehicle is provided. The method comprising: applying a horizontal thrust vector, by a rocket propulsion engine, to the aerospace vehicle, wherein the aerospace vehicle comprises: a first elongated hull having a first aerodynamic tail wing and a first aerodynamic elevator wing; a second elongated hull having a second aerodynamic tail; a center wing section that connects the first elongated hull to the second elongated hull such that the first elongated hull is parallel to the second elongated hull, the aerospace vehicle having a center of gravity at a center point of the center wing section; a first wing extending from the first elongated hull and a second wing extending from the second elongated hull, the first wing and the second wing being coaligned with the center wing section, wherein the first wing and the second wing have respective bottom surfaces that define a horizontal plane; the rocket propulsion engine disposed in center wing section at the center of gravity, the rocket propulsion engine producing the horizontal thrust vector, the rocket propulsion engine being rotatable a central axis that passes through the first wing, the second wing, the center wing section and the center of gravity, such that rotation of the rocket propulsion engine rotates the thrust vector at an angle between 0° and 90° relative to the horizontal plane to assist aerodynamic lift of the aerospace vehicle to enable horizontal takeoff; a pylon structure with a releasably attached second stage vehicle for deployment during flight; permitting the aerospace vehicle to move forward in a horizontal direction by the horizontal thrust vector; rotating the rocket propulsion engine about the central axis such that a vertical thrust vector is produced by the rocket propulsion engine, thereby achieving the aerodynamic lift that lifts the aerospace vehicle away from a horizontal surface; rotating the rocket propulsion engine to provide a thrust vector that increases an altitude of the aerospace vehicle until at least an altitude of at least 121,920 meters; actuating the pylon structure to release the second stage vehicle from the aerospace vehicle at the altitude of at least 121,920 meters; permitting the aerospace vehicle to be pulled toward the horizontal surface by gravity; rotating the rocket propulsion engine about the central axis such that a retro burn thrust vector is produced by the rocket propulsion engine that slows the aerospace vehicle; landing the aerospace vehicle on the horizontal surface.

In a second embodiment, an aerospace vehicle is provided. The Aerospace vehicle comprising: a first elongated hull having a first aerodynamic tail wing and a first aerodynamic elevator wing; a second elongated hull having a second aerodynamic tail; a center wing section that connects the first elongated hull to the second elongated hull such that the first elongated hull is parallel to the second elongated hull, the aerospace vehicle having a center of gravity at a center point of the center wing section; a first wing extending from the first elongated hull and a second wing extending from the second elongated hull, the first wing and the second wing being coaligned with the center wing section, wherein the first wing and the second wing have respective bottom surfaces that define a horizontal plane; a rocket propulsion engine disposed in center wing section at the center of gravity, the rocket propulsion engine producing a thrust vector, the rocket propulsion engine being rotatable a central axis that passes through the first wing, the second wing, the center wing section and the center of gravity, such that rotation of the rocket propulsion engine rotates the thrust vector at an angle between 0° and 90° relative to the horizontal plane to assist aerodynamic lift of the aircraft space launch vehicle to enable horizontal takeoff.

In a third embodiment, an orbital payload delivery system is provided. The orbital payload delivery system comprising: a first stage aerospace vehicle comprising: a first elongated hull having a first aerodynamic tail wing and a first aerodynamic elevator wing; a second elongated hull having a second aerodynamic tail; a center wing section that connects the first elongated hull to the second elongated hull such that the first elongated hull is parallel to the second elongated hull, the first stage aerospace vehicle having a first center of gravity at a center point of the center wing section; a first wing extending from the first elongated hull and a second wing extending from the second elongated hull, the first wing and the second wing being coaligned with the center wing section, wherein the first wing and the second wing have respective bottom surfaces that define a horizontal plane; a rocket propulsion engine disposed in center wing section at the center of gravity, the rocket propulsion engine producing a thrust vector, the rocket propulsion engine being rotatable a central axis that passes through the first wing, the second wing, the center wing section and the center of gravity, such that rotation of the rocket propulsion engine rotates the thrust vector at an angle between 0° and 90° relative to the horizontal plane to assist aerodynamic lift of the aircraft space launch vehicle to enable horizontal takeoff; and a second stage vehicle releasably attached to an upper surface of the first stage aerospace vehicle by a pylon structure, the second stage vehicle have a second center of gravity that is coaligned with the first center of gravity.

This brief description of the invention is intended only to provide a brief overview of subject matter disclosed herein according to one or more illustrative embodiments, and does not serve as a guide to interpreting the claims or to define or limit the scope of the invention, which is defined only by the appended claims. This brief description is provided to introduce an illustrative selection of concepts in a simplified form that are further described below in the detailed description. This brief description is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

So that the manner in which the features of the invention can be understood, a detailed description of the invention may be had by reference to certain embodiments, some of which are illustrated in the accompanying drawings. It is to be noted, however, that the drawings illustrate only certain embodiments of this invention and are therefore not to be considered limiting of its scope, for the scope of the invention encompasses other equally effective embodiments. The drawings are not necessarily to scale, emphasis generally being placed upon illustrating the features of certain embodiments of the invention. In the drawings, like numerals are used to indicate like parts throughout the various views. Thus, for further understanding of the invention, reference can be made to the following detailed description, read in connection with the drawings in which.

DETAILED DESCRIPTION OF THE INVENTION

The present disclosure relates to aerospace vehicle(s) suitable for carrying substantial payload beyond the Earth's atmosphere and for return therefrom. Also disclosed is a technique of combining at least two aerospace vehicles for the horizontal launch from the surface of the earth of large payloads to earth orbital altitudes and beyond. Moreover, the present disclosure provides a logistical support method for constructing and launching vehicles from the surface of the ocean and recovery on ocean surface.

Figure 1A:
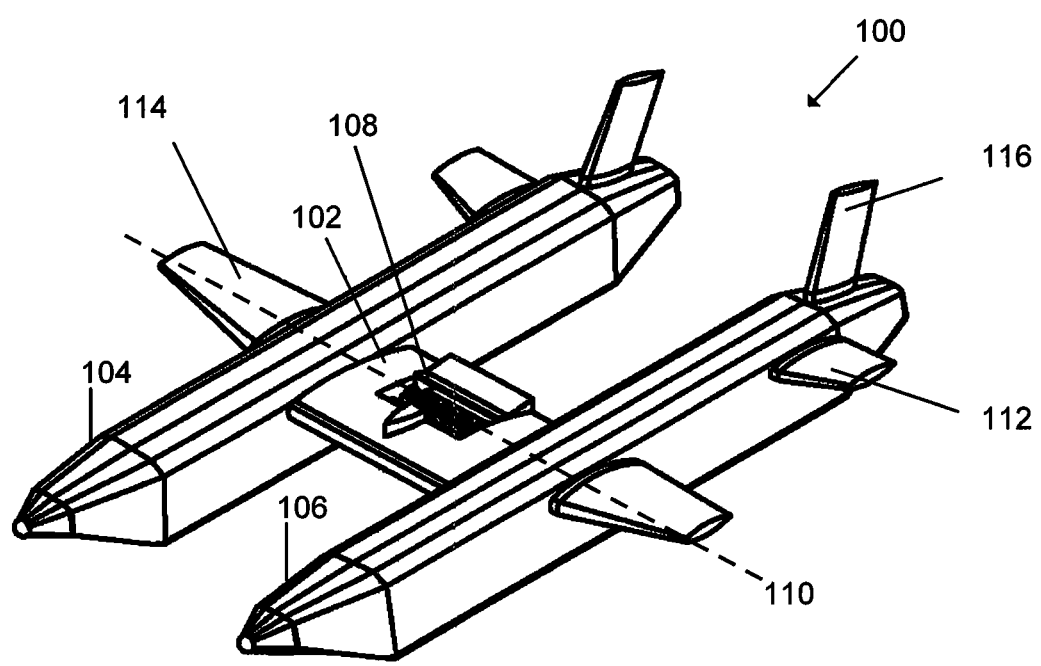
FIG. 1A is a three-dimensional schematic representation of the launch vehicle without upper second stage installed.
Figure 1B:
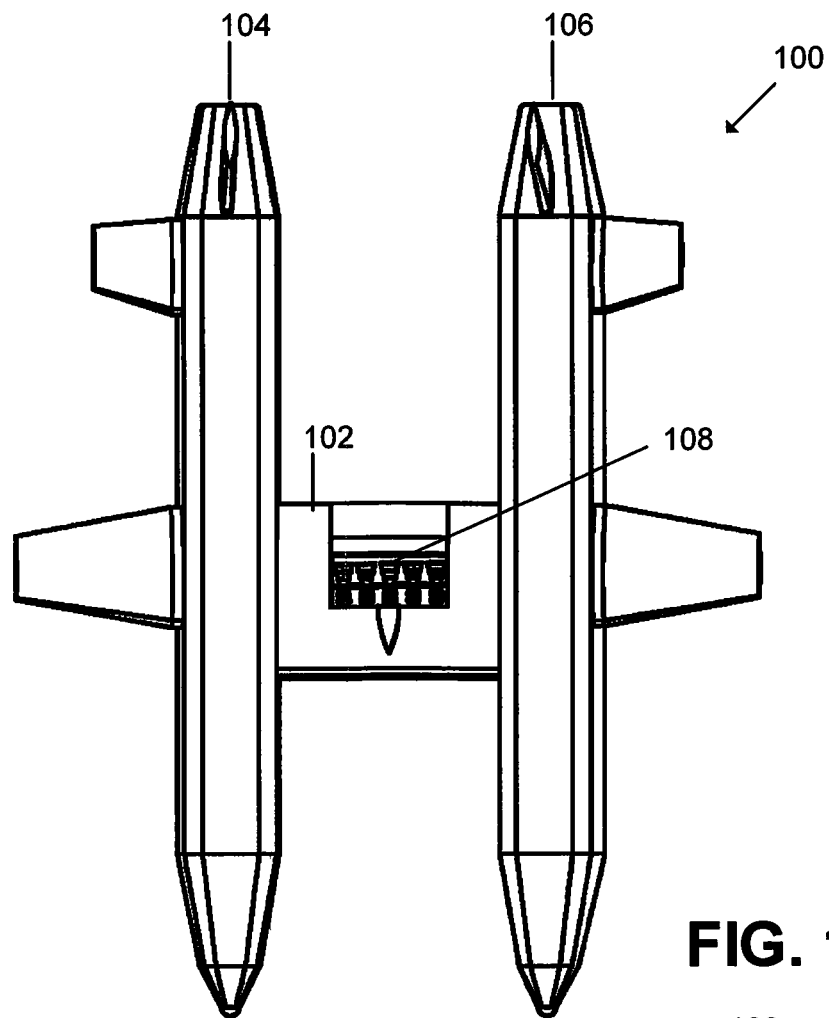
FIG. 1B is a top view of the launch vehicle.
Figure 1C:
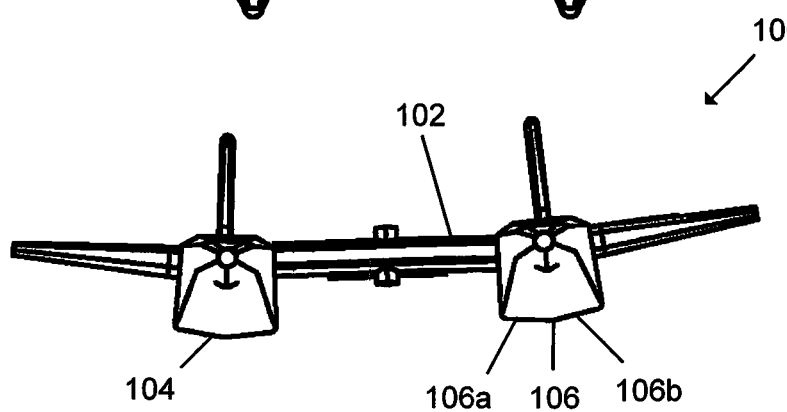
FIG. 1C is a front view of the launch vehicle.

FIG. 1A, FIG. 1B and FIG. 1C illustrate a primary space launch vehicle 100 design and operational parameters of a system that can be a reusable or expendable system for horizontal takeoff and landing is described. The system can be launched from land on track or runway or from the surface of the ocean where it requires minimum launch infrastructure by eliminating pad and gantry and other conventional landing pad systems.

The vehicle 100 comprises a center wing section 102 between two hulls 104, 106 having at least one rocket engine 108 mounted on the center wing section 102 at the vehicle's center of gravity (Cg). The center wing section 102 is disposed between the two hulls 104, 106. Two wing extensions 114, which are parallel to the center axis 110 of the center wing section 102, extended past the hulls 104, 106. The engine 108 is configured to pivot downward (see FIG. 3) about the center axis 110 (e.g. by 90°) to facilitate ignition and vertical movement or pivot horizontal (see FIG. 2) about the center axis 110 (e.g. by 0°) to accelerate along the surface of a track, runway or water surface. This permits the vehicle 100 to liftoff from the surface to fly into space. The rocket engine 108 may pivot to stop at any angle between 0° and 90°. The rocket engine 108 may be an airbreathing rocket engine that consumes oxygen from the surrounding atmosphere. Alternatively, the rocket engine 108 may be a standard rocket engine that consumes oxygen stored onboard. When designed for water launch the hulls 104, 106 act as boat hulls that provide hydrodynamic lift so the vehicle can rise out of the water and "ski" along the surface to accelerate to flight speed. The hulls 104, 106 contain propellant (e.g. liquid propellant) and are of sufficient volume (e.g. 400 cubic feet (11,300 liters) or more for each hull float) to house both the propellant volume with enough displacement of water volume of around 25,000 lbs (11,340 kg) or more for each hull to maintain buoyancy of the hulls 104, 106 while on the surface waiting for launch. In one embodiment, each hull is 40 feet (12.2 m) long and contains 30,000 lbs (13,608 kg) of propellant for a 1,000 lb (454 kg) payload. Propellant tanks occupy a large portion of the float hulls 104, 106 interior and are either single tank or double tank design. The forward tanks can be oxidizer and the rear tanks are for fuel as required for the engine type. The center wing section 102 can also hold propellant. Turbo-pumps for rocket engine 108 and other machinery are located in the center wing section 102 along with communications and electronics also located in the center wing section 102.

Figure 2:
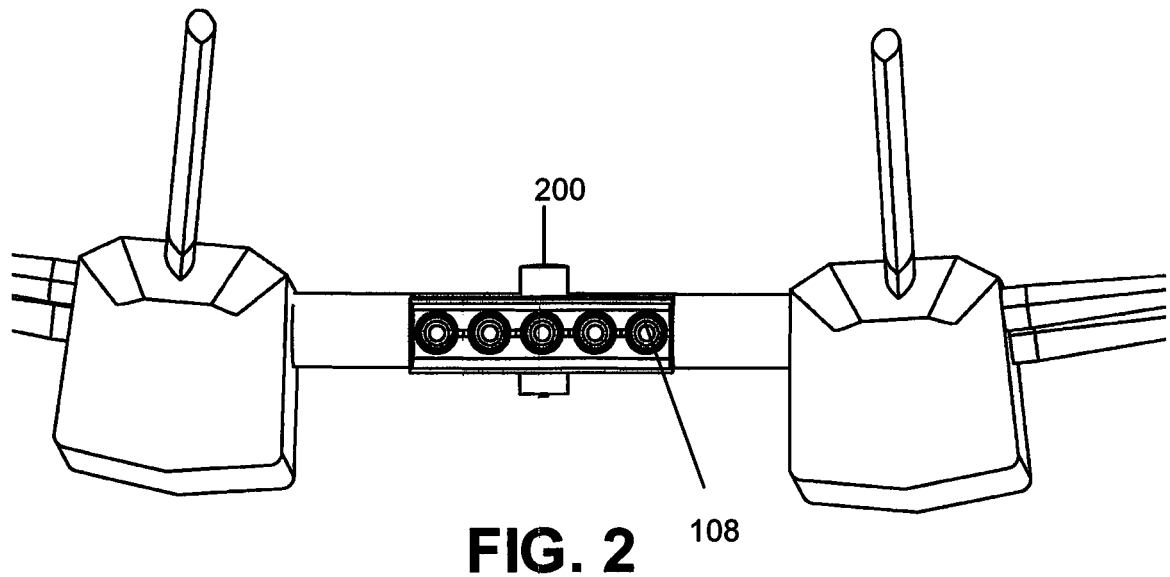
FIG. 2 is a view of the rocket engines in horizontal configuration.
Figure 3:
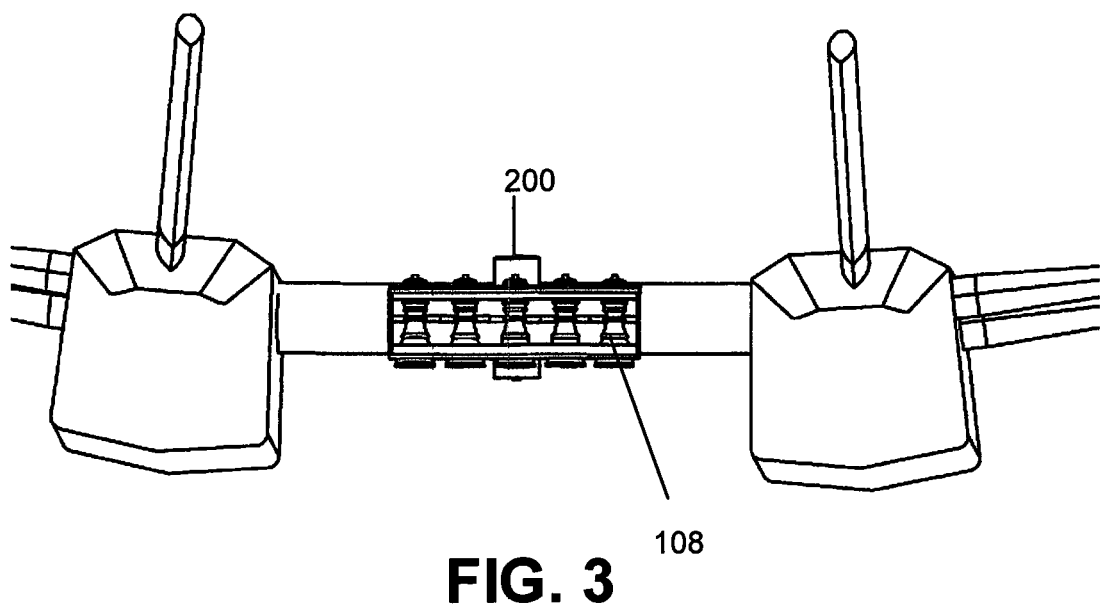
FIG. 3 is a view of the rocket engines in pitch down configuration for lift augmentation.
Figure 5:
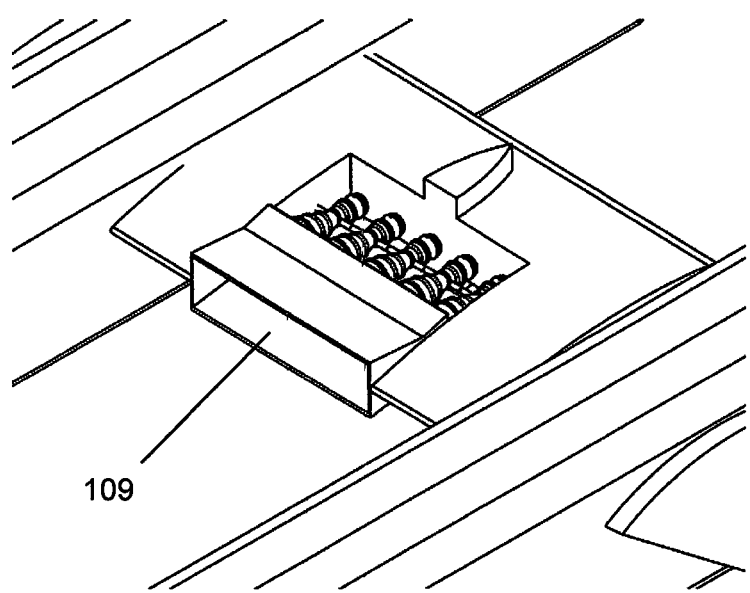
FIG. 5 shows Air Augmented Rocket engine duct airflow.

Referring to FIG. 2 and FIG. 3, in some embodiments, the center wing section 102 comprises a pylon structure 200 supporting an upper second stage (e.g. second stage 600, see FIG. 6 and FIG. 9) or single payload fairing if the vehicle is designed to operate as a single-stage-to-orbit (SSTO). The pylon structure 200 for the second stage mount could also be built into the Air Breathing Rocket Engine Air Duct 109 (in FIG. 5 it is shown as the exhaust duct just after the engine nozzles) providing weight savings using common structure. The advantage of having this piggyback mount of the second stage with engine thrust structure and wing lift structure concentrated in one area reducing the overall weight of the system.

The twin hull catamaran-style design provides for high stability on the water surface and provides for stable high-speed flight over the surface of the water. Each hull 104, 106 has a tail wing 116, an elevator wing 112 and one of the wing extensions 114. The elevator wing 112 and wing extension are in parallel planes with respect to one another and, in one embodiment, are coplanar. The tail wing 116 is perpendicular to both the elevator wing 112 and the wing extensions 114. The wing extensions 114 are coaligned with the center wing section 102 such that the bottom surface of the wing extensions 114 define a first plane and the bottom surface of the center wing section 102 defines a second plane, wherein the first plane and the second plane are parallel. In one embodiment, the first plane and the second plane are coplanar.

One or more of the aforementioned wings may be forward swept wings. The wings provide aerodynamic lift and control of the launch vehicle 100 during assent and decent into the atmosphere. The twin hulls 104, 106 have bottom surface provides that are transversely relatively flat with some angel of dead rise and longitudinally cambered to provide dynamic lift during hypersonic and subsonic atmosphere reentry at high angles of attack (60 degrees). As shown in FIG. 1C, the bottom surface profile also provides for hydrodynamic lift when launched horizontally from the surface of water. The bottom surface has a plurality of flat walls 106a, 106b. In the embodiment of FIG. 1C, two such flat walls are present but other embodiments may have more than two flat walls. The large base surface area of more than 1000 sq. ft (93 square meters) and retro-burn of rockets reduces the reentry temperatures for the vehicle 100 to tolerable levels.

Figure 6:
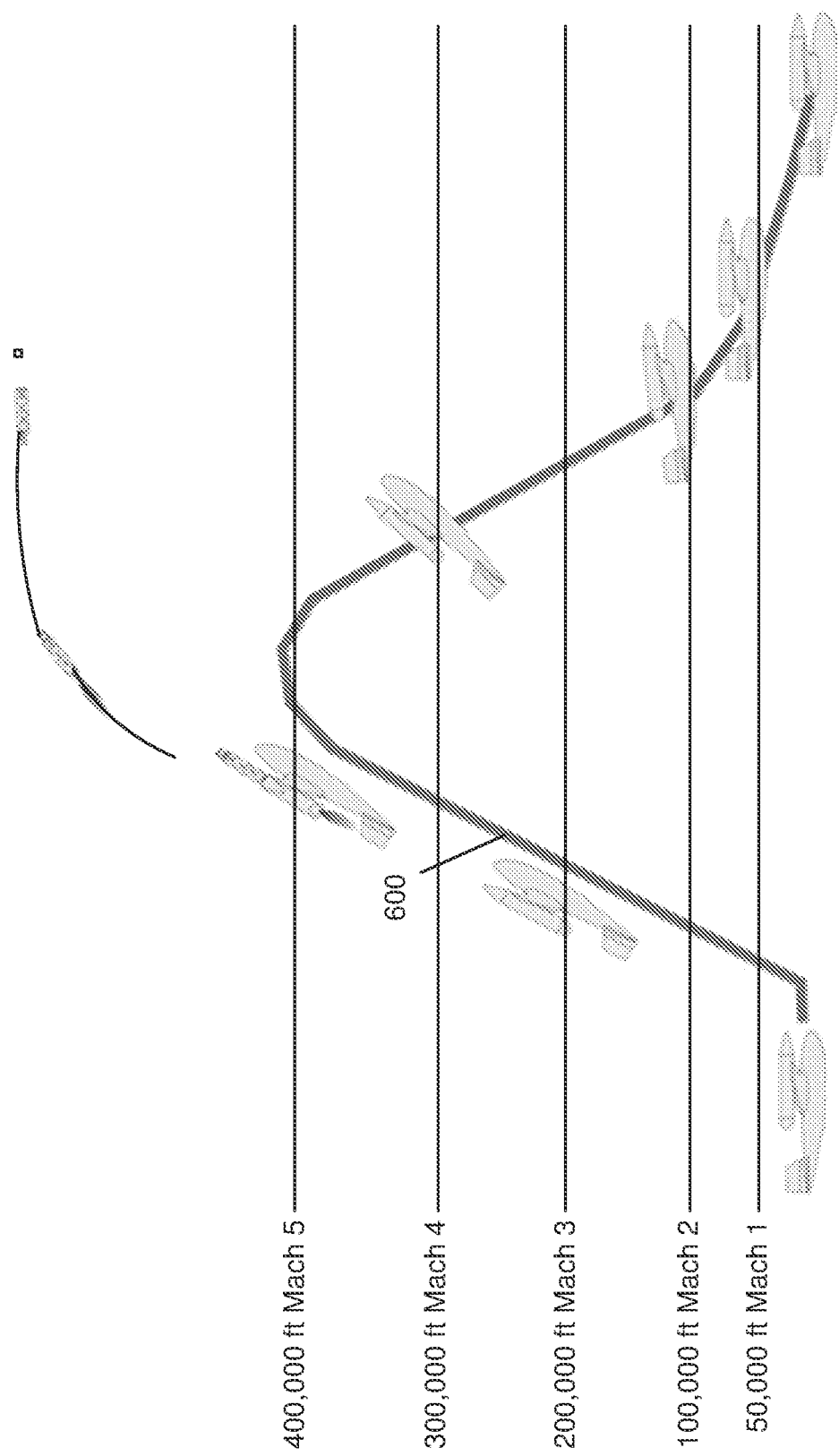
FIG. 6 shows an overall mission flight profile for two stage version of the vehicle.

As shown in FIG. 6, a second stage vehicle 600 is secured in a piggyback fashion to a set of pylon structures above the center wing section for horizontal launch from the surface of the ocean. The system becomes the booster stage for any type of upper second stage 600 both expendable and recoverable as mission requires. The system is able to recover the upper second stage 600 and payload at any point in the vehicle flight using the lifting surfaces of the vehicle 100 only for controlled landing on the ocean surface. The second stage vehicle 600 has a center of gravity that is vertical coaligned with respect to the center of gravity of the vehicle 100.

Figure 4:
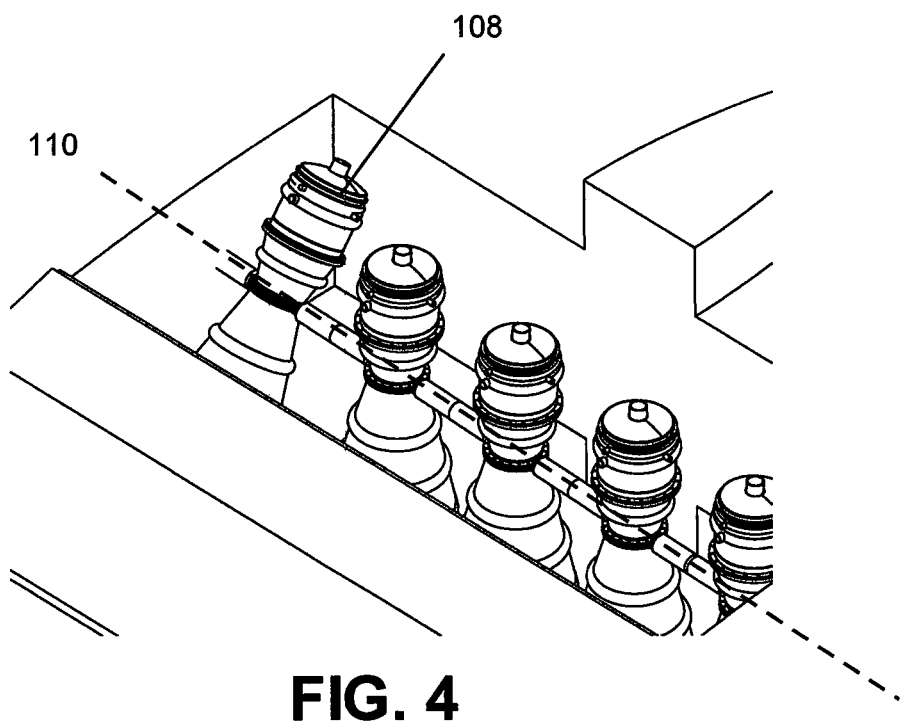
FIG. 4 shows independent pivot of the rocket engines.

A flight from the water would start by having the vehicle 100 point in the general direction of the flight path or into the wind, or if land launched then readied at the end of a runway or launch track. The rocket engines 108 having a thrust of more than 75,000 lbs (34,019 kg) may be pitched down so the nozzles face towards the water or ground surface. See FIG. 4. Each rocket engine 108 may be independently rotated so that during reentry one or more of them can be rotated depending on the thrust required to slow down and throttle setting limits of each engine. If the second stage fails to launch then a greater total weight will need to be slowed down for reentry and therefore more rocket engines can be rotated for deceleration. Rocket engines 108 by nature are easier to ignite and bring up to thrust in this attitude preventing propellant pooling and hard starts. After ignition the rocket engines 108 are rotated to the horizontal where thrust is increased to accelerate the vehicle along the surface of the water, runway or launch track. See FIG. 5. On the water this acceleration will generate hydrodynamic lift from both hulls 104, 106 pulling the vehicle 100 out of the water, reducing friction and facilitating acceleration to flight speed. On a land launch acceleration timing is critical due to runway or track length limits.

Once vehicle 100 is traveling fast enough, the tail wings 116 and wing extensions 114, including the elevator wings 112, that are all-flying tail surfaces in that they entire surface rotates around a common axis and have sufficient control forces (dynamic air pressure) to pitch and roll the vehicle 100 about its axis. At a surface velocity normal to large airliners during takeoff the rocket engines 108 are pitched down again approximately 55 to 90 degrees to unload the full weight of the vehicle 100 allowing the now unloaded wings aerodynamic lift to pull the launch vehicle 100 off the surface. After liftoff the Elevators surfaces move to pitch the vehicle nose up and the rocket engines 108 pitch back at a matching rate to maintain full climb with the engine thrust and wing aerodynamic lift collectively supporting the climb out of the vehicle for acceleration to space.

In one embodiment, the vehicle 100 achieves certain velocity thresholds are specific altitudes. The vehicle 100 may achieve a velocity of Mach 1 at an altitude of 50,000 ft (15,240 meters); Mach 2 at 100,000 ft (30,480 meters); Mach 3 at 200,000 ft (60,960 meters); Mach 4 at 300,000 (91,440 meters) and Mach 5 at 400,000 ft (121,920 meters).

Figure 7:
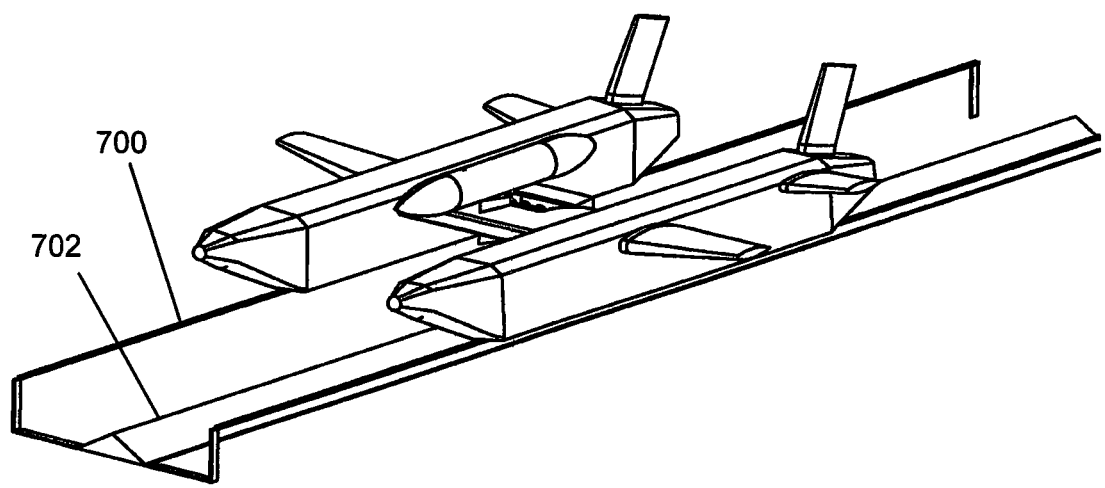
FIG. 7 shows the launch vehicle on a track for launch on land.
Figure 8A:
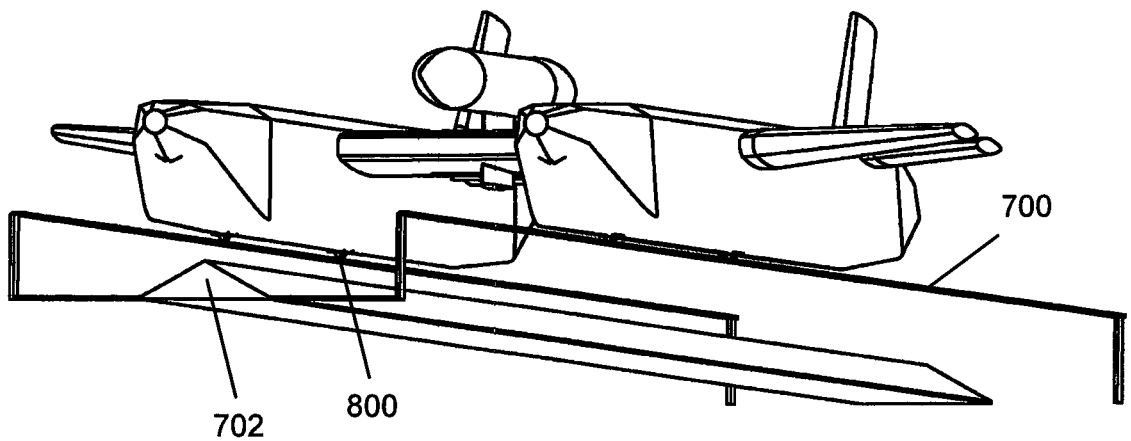
FIG. 8A and FIG. 8B show the wheels and center rocket exhaust deflector.
Figure 8B:
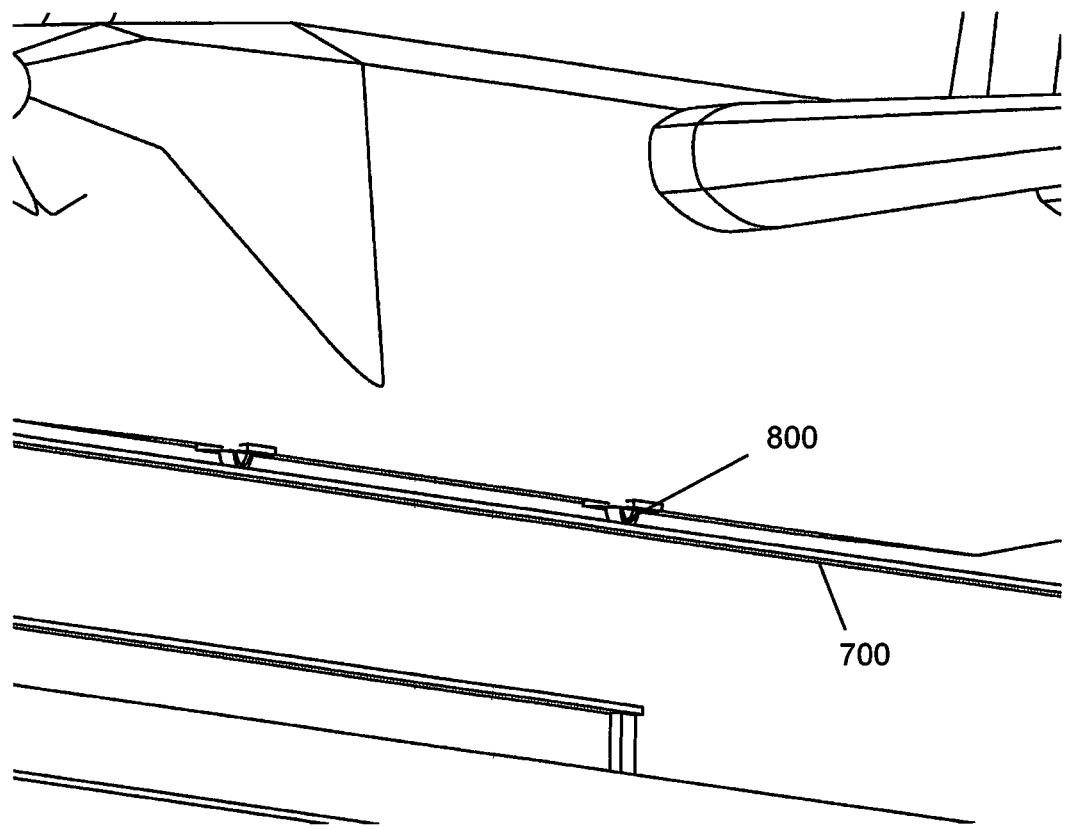

In one embodiment, the vehicle 100 is launched from land using a rail track. Referring to FIG. 7 and FIG. 8A, the vehicle 100 is launched from a steel rail track 700. The rail track 700 of FIG. 7 has a triangular exhaust deflector 702 on a lower surface of the rail track 700 to deflect rocket engine exhaust. FIG. 8B shows a close-up view of rail wheels 800 that reduce the friction between the vehicle 100 and the rail track 700. In one embodiment, the rail wheels 800 may be comprised of carbon fiber or steel.

The combination of aerodynamic lift and engine thrust allow for unique fuel saving departure trajectories that vertical takeoff heavy lift ballistic rockets cannot achieve. Additionally, the design lends itself to easier air breathing rocket engine installation due to the clear frontal area in front of the center wing mounted engine location. Air augmented rocket thrust improving performance of the overall system can allow for lighter overall designs improving "undercarriage" performance and sizing with the engine location providing for minimum weight duct designs. The center of gravity and center-line mounting of propulsion in the disclosed vehicle 100 allows for light weight air-breathing engine development due to clear front intakes made possible by this center wing section 108 in comparisons to tail mounted engine launch vehicles. Lighter launch vehicle due to lower fuel weight needed from air breathing systems reduces "undercarriage" or hull strength and weight requirements.

Figure 9:
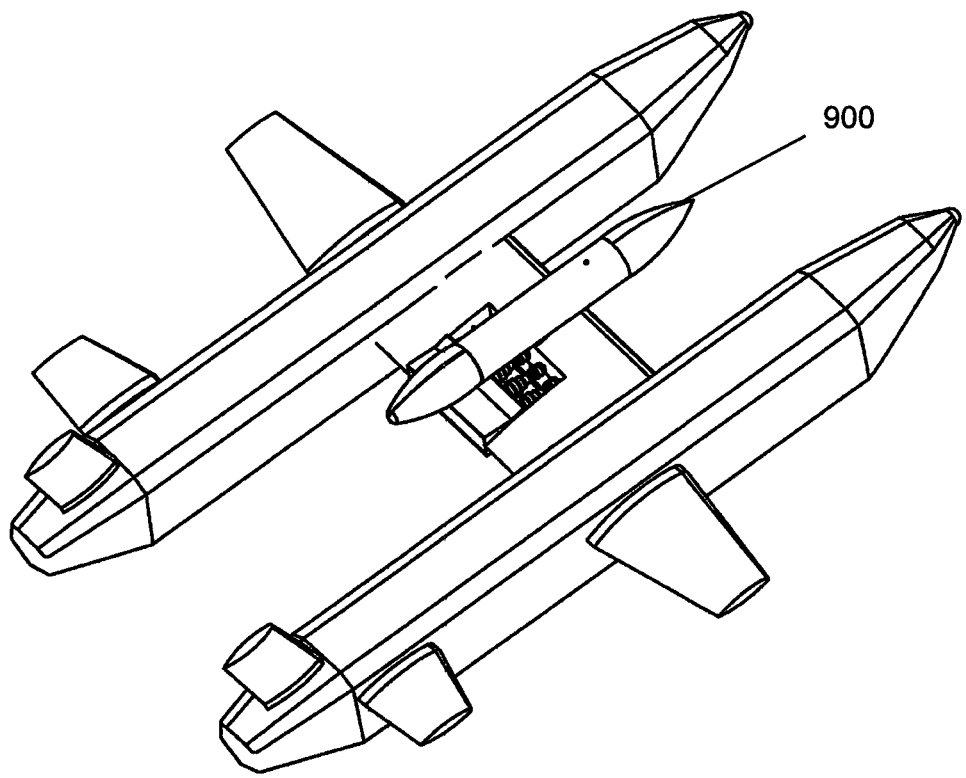
FIG. 9 shows installation of an upper stage launch tube.
Figure 10:
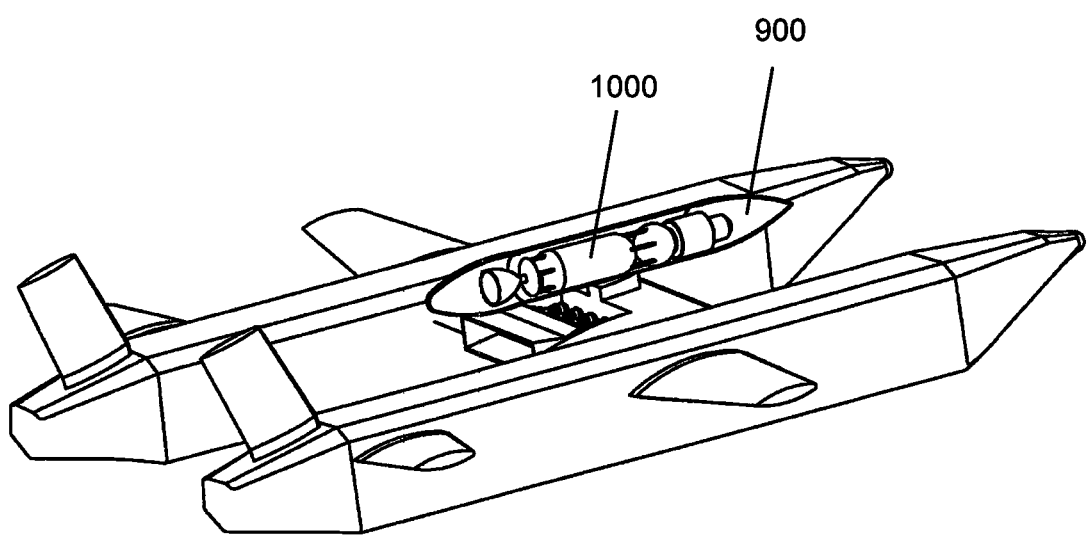
FIG. 10 shows cutaway of the launch tube to reveal the second stage inside before launch into space.
Figure 11:
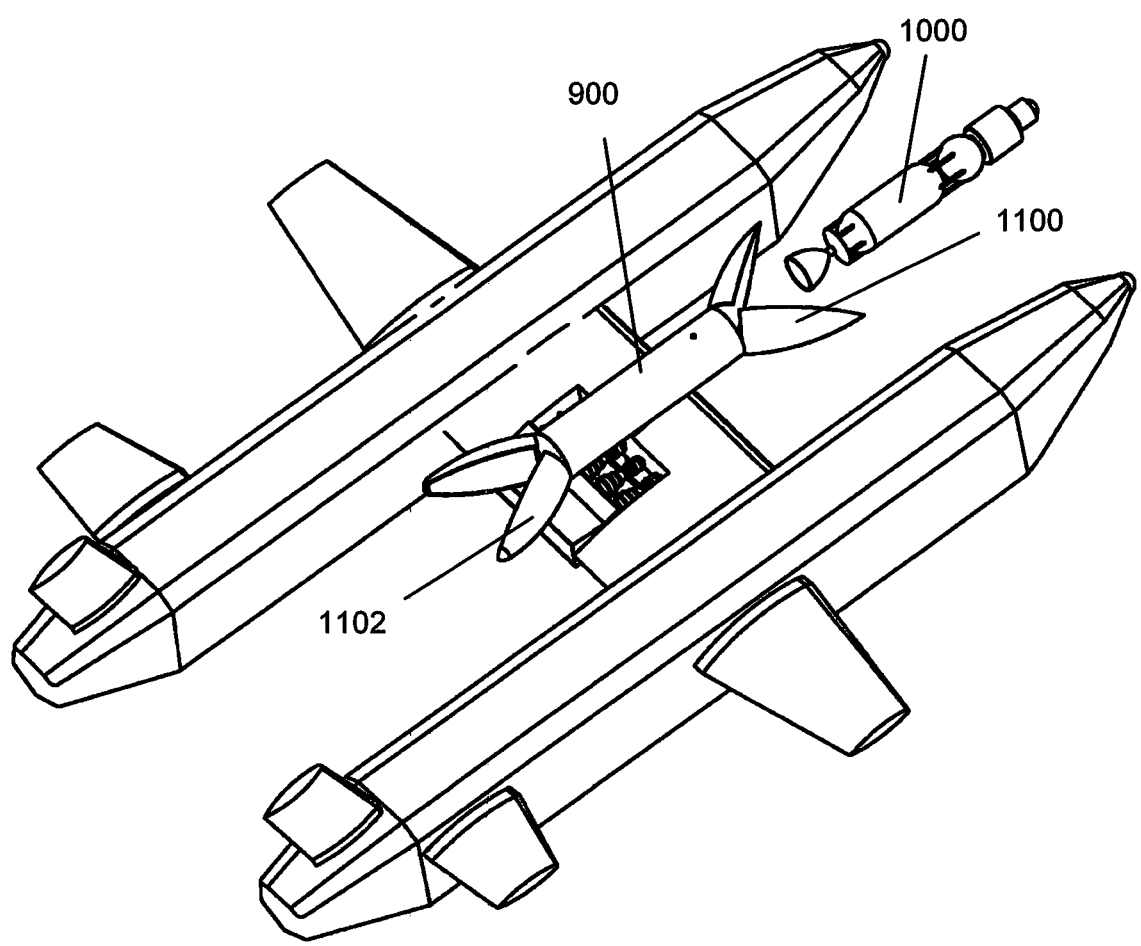
FIG. 11 shows the nose and tail cone of the launch tube open and the second stage having left the tube with engine running.

As shown in FIG. 9, one embodiment has an upper stage launch tube 900 installed on the pylon structure. Inside this launch tube 900 is loaded one or more upper stage payload 1000 (FIG. 10). The launch tube 900 is aerodynamically shaped so the upper stage payload 1000 is not subject to aerodynamic loads. This allows for light weight construction of the upper stage payload 1000 since they are deployed or launched out of the launch tube 900 into the vacuum of space. When the first stage is out of the atmosphere in the vacuum of space the front nose cone 1100 (see FIG. 11) is opened and the rear tail cone 1102 are opened to allow the second stage engine to ignite and push the upper stage payload 1000 out of the launch tube 900. The engine exhaust escapes out the rear tail cone 1102 opening as shown in FIG. 11. Should the second stage engine not light due to a malfunction the front nose cone 1100 and rear tail cone 1102 are closed again and the complete system, including upper stage payload 1000, is returned to the surface of the water for safe recovery. If the second stage is launched successfully then the front nose cone 1100 and rear tail cone 1102 are closed and the complete launch tube 900 is returned with the first stage empty.

The ascent trajectory of the vehicle 100 brings the upper stage to a preselected staging altitude and velocity. When staging occurs the upper stage engine is started and the complete upper stage is thrust free from the lower booster stage. After separation the engines on the lower stage are shut down allowing the Earth's gravitational field to pull the vehicle 100 back into the atmosphere. Just before atmosphere reentry the engine rocket 108 is started again and provide a retro burn thrust vector to slow down the first stage to low subsonic speed. The vehicle 100 reentry angle is approximately 60 degrees to the relative wind with the lifting wings surface in complete stall. After reentry and slowing to subsonic speed the vehicle pitch is reduced to around 10 degrees for normal subsonic flight. The vehicle 100 glides down to the surface of the ocean were it makes a controlled landing.

The launch vehicle 100 can operate as a Single-Stage-To-Orbit (SSTO) or as a Two-Stage-To-Orbit (TSTO) with the first stage for a vehicle either carried on the upper surface of the vehicle 100 or hung below as a third hull float if used for water launch. The vehicle 100 can also be configured for land launch and recovery using a track system or wheel-ski style undercarriage.

If the vehicle 100 is designed as a Single Stage to Orbit (SSTO) then after reaching orbit the payload is deployed and the vehicle prepares for reentry. See FIG. 6. If the SSTO vehicle is an expendable design then destructive reentry is performed to remove the vehicle from orbit and any on-orbit debris it could generate. If designed as a Two-Stage-To-Orbit (TSTO) the vehicle 100 will release, at high speed and altitude, an upper second stage 600 carried on a pylon structure 200 that would continue to orbit. The design of this upper second stage 600 could be expendable or a type of recoverable vehicle as long as the design fits the overall liftoff weight restrictions for the complete vehicle 100. The upper second stage 600 can also be carried in a launch tube shroud that protects the payload, upper stage(s) engines from aerodynamic loads. The upper second stage 600 is then launched into the vacuum of space after first stage burn. In one embodiment, the vehicle 100 uses the reentry profile described in the U.S. Pat. No. 3,702,688 Space Shuttle Vehicle and System by Maxime Faget. While the launch vehicle system described by Faget is similar in approach to reentry as the disclosed system the overall configuration does not allow for horizontal takeoff using the wings on the vehicle and orbiter due to the rear (tail) location of the propulsion system. The Faget system needs to be vertically launched as a conventional rocket vehicle.

If the launch vehicle 100 has been designed to be reusable it will have a thermal protection system for protection during reentry and can fly back to the same water, runway surface where it will perform a conventional low speed horizontal landing. To make a fully recoverable system as light as possible the reentry is performed at a high angle of attack between 45 to 60 degrees. This type of high angle reentry is a low lift to drag ballistic reentry that keeps the heating profile, intensity and duration at a much lower level than experienced by high lift to drag reentry vehicles such as the United States Space shuttle. After the upper second stage 600 is deployed the rocket engines 108 can pivot down (e.g. to 60-90°) to provide a retro burn and slow the vehicle 100 down to just over Mach 1 to control reentry heating.

The unique fixed geometry of the launch vehicle 100 described here allows for complete stability around its three axes during reentry. The vehicle 100 specifically has high and low angle of attack trim stability in both hypersonic and subsonic regimes. The longitudinal boat ski shaped hull fuselage and elevator wings provide pitch stability at high angle of attack with the wing extensions at a full stall.

Aerodynamic stability during reentry is maintained using standard type reaction control rockets (RCS)—(not shown on figures) and aerodynamic surfaces. At some point during reentry the RCS system and aerodynamic controls are working together to maintain the high angle of attack reentry with blended control changing over to purely aerodynamic when sufficient dynamic pressure is felt by the vehicle in the atmosphere. The reentry configuration and distribution of surface are under each hull and dihedral of wings is designed to propagate a shock wave ahead of the vehicle and be dynamically stable at 60° angle of attack to the relative wind.

After ballistic reentry the vehicle 100 keeps the same high angle of attack until it has reached a subsonic speed, likely at around 40,000 ft (12 km). The vehicle 100 then pitches over and flies back to the launch site either gliding or under power. The now empty and very light tanks located in the twin hulls 104, 106 provide for a stable and slow speed landing on the water or runway surface either downrange from or back towards initial launch site.

The tail wing 116 and elevator wing 112 are hot structures with some active cooling loops for management of orbital speed reentry heating. The hot structures are used to manage engine exhaust radiation and gas impingement heating on ascent. Active cooling on the elevator wings 112 along the leading edge is provided during orbital reentry to dissipate leading edge heating. The float hulls 104, 106 and under surface of the elevator wings 112 are protected during reentry using a variety of active cooling systems such as water spray inside the components and using the phase change in water while venting the steam to the outside at local atmospheric pressure. It would be appreciated by those skilled in the art that other thermal protection systems could be applied as currently used on other spacecraft reentry vehicles. Runway and track launch system may use light weight tile thermal protection systems not applicable to water takeoff and landing versions. Those skilled in the art will appreciate the advantage of dissipating the reentry heating in the shock wave ahead of the vehicle thereby reducing the heat transferred to the vehicle structure during orbital reentry.

An onboard computer control and navigation system (housed in the central wing section 102) automatically brings the launch vehicle through reentry and controls the vehicle completely until landing on the water surface. The onboard computer control can also send commands to the launch vehicle 100 to change landing location or take over some of the flight operations by remote control.

Alternate reentry and recovery profiles could be introduced depending on the fight energy required. For example, the rocket engine 108 could be used to decelerate and send the vehicle 100 on a toss-back reentry path and landing glide that will bring it back closer to the launch point. This could facilitate easier recovery since the empty launch vehicle could land very close to shore in complete safety and towed a short distance to the harbor.

Aerodynamic propulsion, such as a turboprop, can be added to the empty second stage pylon structure allowing the launch vehicle 100 to fly as a conventional boat plane for the purpose of air ferry back to base or on to new launch sites. Since the reentry and landing causes no structural degradation of the vehicle 100 minimum refurbishment is required to put the launch vehicle 100 back on the flight line. Turn around in one day or less is possible with the disclosed system.

The only logistics support this type of vehicle needs would come from a single propellant loading and launch control tug vessel, that would pull the vehicle off shore, load propellants and act as air traffic control for launch. After return of the vehicle 100 from space the same vessel can tow the launch vehicle back to port for reloading of a new payload and inspection before next flight.

It can be recognized to those skilled in the art of ocean ship building that this concept could be scaled to enormous size due to the launch vehicles operating from the surface of the earth's oceans. Record size payloads could be launched from very large launch vehicles built in the configuration of the present system when launched from the ocean.

The disclosed system has the following advantages over other vertical launch and recovery ballistic rockets. (1) Ability to launch directly from the Earth's equator on the ocean surface, which allows use of the Earth's rotation, thus increasing the up-mass capability of launchers during launches of spacecraft to orbit. (2) Ability to launch with any azimuth from open sea, thus making launches free of political risks, simplifying international cooperation during spacecraft launches, as well as making unnecessary any reservation of tracts of land for both the launch site with its safe area, and areas where the jettisoned drop tanks and payload fairing halves impact on the ground. (3) Compactness, no need to have a well-developed ground infrastructure and its associated social support system, which radically reduces the numbers of personnel participating in the work, and, therefore, the cost of operation. All that is needed are a tug and or fuel ships for each flight. With shore propellant loading requiring only a tug vessel. (4) Multiple vehicles can launch at the same time since no launch pad or gantry structure is needed. Launch pads are not a bottleneck and a fleet can be launched side by side on the ocean in formation flight to orbit close to each other. (5) Total re-usability for launch vehicle when used as either booster or orbital vehicle with launch abort at any point during the vehicle operation. (6) Can be scaled to massive proportions requiring only the appropriate rocket engine thrust. Would allow for development of million-pound payloads to LEO something not possible with land-based systems. (7) Noise reduction due to sidewall floats and remote ocean location. (8) Total abort/recovery capability of payload from launch to second stage separation. (second stage could be reusable and allow recovery at any point during flight to orbit) (9) Can be prepared for launch in any port in complete safety from weather and or fueled at sea by ship removing any hazard to public safety. (same as for launch vacuum impact point) (10) Can carry upper stage (orbiter) directly over vehicle center of gravity making for easy adaption to multiple orbiter designs or carry under center wing as drop tank-floats. Rear center of gravity upper stages can be accommodated. (11) Opens up possibility of more engine design solutions for rocket/air-breathing systems due to clear frontal intake area forward of center wing. This could be turbojet-ramjet-air augmentation and other systems much more difficult to develop for rockets with engines in the tail.

While the invention has been described with reference to certain embodiments, it will be understood by those skilled in the art that various changes may be made and equivalents may be substituted for elements thereof to adapt to particular situations without departing from the scope of the disclosure. Therefore, it is intended that the claims not be limited to the particular embodiments disclosed, but that the claims will include all embodiments falling within the scope and spirit of the appended claims.

What is claimed is:

1. A method for horizontally launching an aerospace vehicle, the method comprising:
    applying a horizontal thrust vector, by a plurality of rocket propulsion engines, to the aerospace vehicle, wherein the aerospace vehicle comprises:
    a first elongated hull having a first aerodynamic tail wing and a first aerodynamic elevator wing;
    a second elongated hull having a second aerodynamic tail;
    a center wing section that connects the first elongated hull to the second elongated hull at a middle of each respective elongated hull such that the first elongated hull is parallel to the second elongated hull, the aerospace vehicle having a center of gravity at a center point of the center wing section;
    a first wing extending from the first elongated hull and a second wing extending from the second elongated hull, the first wing and the second wing being coaligned with the center wing section, wherein the first wing and the second wing have respective bottom surfaces that define a horizontal plane;
    the plurality of rocket propulsion engines being disposed in the center wing section at the center of gravity, at least one of the rocket propulsion engines producing the horizontal thrust vector, each rocket propulsion engine in the plurality of rocket propulsion engines being independently rotatable about a central axis that passes through the first wing, the second wing, the center wing section and the center of gravity, such that rotation of the rocket propulsion engine rotates the thrust vector at an angle between 0° and 90° relative to the horizontal plane to assist aerodynamic lift of the aerospace vehicle to enable horizontal takeoff;
    a pylon structure with a releasably attached second stage vehicle for deployment during flight;
    permitting the aerospace vehicle to move forward in a horizontal direction by the horizontal thrust vector;
    rotating the rocket propulsion engine about the central axis such that a vertical thrust vector is produced by the rocket propulsion engine, thereby achieving the aerodynamic lift that lifts the aerospace vehicle away from a horizontal surface;
    rotating the rocket propulsion engine to provide a thrust vector that increases an altitude of the aerospace vehicle until at least an altitude of at least 121,920 meters;
    actuating the pylon structure to release the second stage vehicle from the aerospace vehicle at the altitude of at least 121,920 meters;
    permitting the aerospace vehicle to be pulled toward the horizontal surface by gravity;
    rotating the rocket propulsion engine about the central axis such that a retro burn thrust vector is produced by the rocket propulsion engine that slows the aerospace vehicle; and
    landing the aerospace vehicle on the horizontal surface.

2. The method as recited in claim 1, further comprising re-using the aerospace vehicle to repeat the method as least once.

3. The method as recited in claim 1, wherein the rocket propulsion engine is an air breathing rocket propulsion engine.

4. The method as recited in claim 1, wherein the rocket propulsion engine is a rocket engine that consumes oxygen stored onboard the aerospace vehicle.

5. An aerospace vehicle comprising:
    a first elongated hull having a first aerodynamic tail wing and a first aerodynamic elevator wing;
    a second elongated hull having a second aerodynamic tail;
    a center wing section that connects the first elongated hull to the second elongated hull at a middle of each respective elongated hull such that the first elongated hull is parallel to the second elongated hull, the aerospace vehicle having a center of gravity at a center point of the center wing section;
    a first wing extending from the first elongated hull and a second wing extending from the second elongated hull, the first wing and the second wing being coaligned with the center wing section, wherein the first wing and the second wing have respective bottom surfaces that define a horizontal plane; and
    a plurality of rocket propulsion engines disposed in center wing section at the center of gravity, the rocket propulsion engines producing a thrust vector, each rocket propulsion engine being independently rotatable about a central axis that passes through the first wing, the second wing, the center wing section and the center of gravity, such that rotation of the rocket propulsion engines rotates the thrust vector at an angle between 0° and 90° relative to the horizontal plane to assist aerodynamic lift of the aerospace vehicle to enable horizontal takeoff.

6. The aerospace vehicle as described in claim 5, further comprising an Air Breathing Rocket Engine Air Duct on the center wing section.

7. The aerospace vehicle as described in claim 6, wherein the Air Breathing Rocket Engine Air Duct has an integrated pylon structure for second stage mounting and deployment during flight.

8. The aerospace vehicle as described in claim 5, wherein the first elongated hull and the second elongated hull are comprised of a plurality of flat walls.

9. The aerospace vehicle as described in claim 5, wherein the first elongated hull and the second elongated hull each comprise a liquid propellant.

10. The aerospace vehicle as described in claim 5, wherein the first elongated hull and the second elongated hull have wheels on a bottom surface to provide support during track or runway launch and landing at end of flight.

11. An orbital payload delivery system comprising:
a first stage aerospace vehicle comprising:
a first elongated hull having a first aerodynamic tail wing and a first aerodynamic elevator wing;
a second elongated hull having a second aerodynamic tail;
a center wing section that connects the first elongated hull to the second elongated hull at a middle of each respective elongated hull such that the first elongated hull is parallel to the second elongated hull, the first stage aerospace vehicle having a first center of gravity at a center point of the center wing section;
a first wing extending from the first elongated hull and a second wing extending from the second elongated hull, the first wing and the second wing being coaligned with the center wing section, wherein the first wing and the second wing have respective bottom surfaces that define a horizontal plane;
a plurality of rocket propulsion engines disposed in the center wing section at the center of gravity, the rocket propulsion engines producing a thrust vector, each of the rocket propulsion engine being independently rotatable about a central axis that passes through the first wing, the second wing, the center wing section and the center of gravity, such that rotation of the rocket propulsion engines rotates the thrust vector at an angle between 0° and 90° relative to the horizontal plane to assist aerodynamic lift of the aerospace vehicle to enable horizontal takeoff; and
a second stage vehicle releasably attached to an upper surface of the first stage aerospace vehicle by a pylon structure, the second stage vehicle have a second center of gravity that is coaligned with the first center of gravity.

12. An orbital payload delivery system comprising:
a first stage aerospace vehicle comprising:
a first elongated hull having a first aerodynamic tail wing and a first aerodynamic elevator wing;
a second elongated hull having a second aerodynamic tail;
a center wing section that connects the first elongated hull to the second elongated hull such that the first elongated hull is parallel to the second elongated hull, the first stage aerospace vehicle having a first center of gravity at a center point of the center wing section;
a first wing extending from the first elongated hull and a second wing extending from the second elongated hull, the first wing and the second wing being coaligned with the center wing section, wherein the first wing and the second wing have respective bottom surfaces that define a horizontal plane;
a rocket propulsion engine disposed in center wing section at the center of gravity, the rocket propulsion engine producing a thrust vector, the rocket propulsion engine being rotatable a central axis that passes through the first wing, the second wing, the center wing section and the center of gravity, such that rotation of the rocket propulsion engine rotates the thrust vector at an angle between 0° and 90° relative to the horizontal plane to assist aerodynamic lift of the aerospace vehicle to enable horizontal takeoff; and
a second stage vehicle releasably attached to an upper surface of the first stage aerospace vehicle by a pylon structure, the second stage vehicle have a second center of gravity that is coaligned with the first center of gravity, wherein the second stage vehicle is contained in a launch tube with a nose cone and a tail cone configured to open to deploy the second stage vehicle to orbit.

* * * * *